US012777107B2

(12) United States Patent
Gao

(10) Patent No.: US 12,777,107 B2
(45) Date of Patent: Oct. 27, 2026

(54) DETERMINING AUDIO INPUT SIGNAL FORMAT USED BY MULTIPLE TERMINALS

(71) Applicant: BEIJING XIAOMI MOBILE SOFTWARE CO., LTD., Beijing (CN)

(72) Inventor: Shuo Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/852,951

(22) PCT Filed: Mar. 31, 2022

(86) PCT No.: PCT/CN2022/084521

§ 371 (c)(1),
(2) Date: Sep. 30, 2024

(87) PCT Pub. No.: WO2023/184383

PCT Pub. Date: Oct. 5, 2023

(65) Prior Publication Data

US 2025/0227169 A1 Jul. 10, 2025

(51) Int. Cl.
*H04L 69/24* (2022.01)
*H04W 28/16* (2009.01)

(52) U.S. Cl.
CPC ............. *H04L 69/24* (2013.01); *H04W 28/16* (2013.01)

(58) Field of Classification Search
CPC ............................... H04L 69/24; H04W 28/16
USPC ........................................................... 709/227
See application file for complete search history.

(56) References Cited

U.S. PATENT DOCUMENTS

| | | | | |
|---|---|---|---|---|
| 6,798,786 B1 * | 9/2004 | Lo | H04L 65/80 370/468 |
| 8,265,696 B1 * | 9/2012 | Verkama | H04W 88/181 704/200 |
| 2004/0047437 A1 * | 3/2004 | Hamiti | H04W 28/18 375/326 |

(Continued)

FOREIGN PATENT DOCUMENTS

| | | |
|---|---|---|
| CN | 1511406 A | 7/2004 |
| CN | 101635994 A | 1/2010 |
| CN | 108513320 A | 9/2018 |

OTHER PUBLICATIONS

Chinese Patent Application No. 202280001087.7, Office Action dated Jan. 12, 2024, 8 pages.

(Continued)

*Primary Examiner* — David P Zarka
(74) *Attorney, Agent, or Firm* — Cozen O'Connor

(57) ABSTRACT

A method for capability determination is performed by a core network element, and includes: receiving a first identifier set, and receiving a second identifier set, in which the first identifier set is configured to indicate at least one audio input signal format supported by a first terminal, the first identifier set is reported by the first terminal, the second identifier set is configured to indicate at least one audio input signal format supported by a second terminal, and the second identifier set is reported by the second terminal; and determining, based on the first identifier set and the second identifier set, an audio input signal format used by the first terminal and the second terminal during establishment of a communication link.

19 Claims, 4 Drawing Sheets

(56) References Cited

U.S. PATENT DOCUMENTS

| | | | | |
|---|---|---|---|---|
| 2014/0325578 | A1* | 10/2014 | Huang | H04N 21/234309 725/116 |
| 2016/0315762 | A1* | 10/2016 | Moon | H04L 9/065 |
| 2017/0134440 | A1* | 5/2017 | Morita | H04L 65/403 |
| 2017/0134697 | A1* | 5/2017 | Imai | H04N 7/15 |
| 2017/0257411 | A1* | 9/2017 | Veeramani | H04L 65/613 |
| 2017/0272779 | A1* | 9/2017 | Neff | H04N 19/85 |
| 2022/0191638 | A1* | 6/2022 | Stengel | G06T 7/70 |
| 2022/0345234 | A1* | 10/2022 | Morris | H04S 3/002 |

OTHER PUBLICATIONS

Chinese Patent Application No. 202280001087.7, English translation of Office Action dated Jan. 12, 2024, 7 pages.

PCT/CN2022/084521 International Search Report and Written Opinion dated Dec. 14, 2022, 7 pages.

PCT/CN2022/084521 English translation of International Search Report and Written Opinion dated Dec. 14, 2022, 8 pages.

* cited by examiner

DETERMINING AUDIO INPUT SIGNAL FORMAT USED BY MULTIPLE TERMINALS

CROSS-REFERENCE TO RELATED APPLICATIONS

This application is the US national phase application of International Application No. PCT/CN2022/084521, filed on Mar. 31, 2022, the entire contents of which are incorporated herein by reference.

TECHNICAL FIELD

The present disclosure relates to the field of communication technologies, and more particularly, to a method and a device for capability determination, and a method for capability reporting.

BACKGROUND

In mobile communications, a core network element needs to be informed of audio encoding and decoding capabilities of each terminal. When a first terminal and a second terminal establish a communication link, the core network element performs negotiation and determines an audio codec used by them.

Due to software and/or hardware limitations of a terminal device, there may be a case where the terminal device cannot support all the operating modes of a codec. For example, the terminal device cannot support all the operating modes of an immersive voice and audio services (IVAS) codec.

At this time, after the audio codec is determined, the core network element cannot negotiate and determine an audio input signal format used by the first terminal and the second terminal during establishment of a communication link because the core network element cannot acquire an operating mode of the codec supported by the first terminal and the second terminal.

SUMMARY

According to a first aspect of the present disclosure, there is provided a method for capability determination. The method is performed by a core network element and includes:

- receiving a first identifier set, and receiving a second identifier set, in which the first identifier set is configured to indicate at least one audio input signal format supported by a first terminal, the first identifier set is reported by the first terminal, the second identifier set is configured to indicate at least one audio input signal format supported by a second terminal, and the second identifier set is reported by the second terminal; and
- negotiating and determining, based on the first identifier set and the second identifier set, an audio input signal format used by the first terminal and the second terminal during establishment of a communication link.

According to a second aspect of the present disclosure, there is provided a method for capability reporting. The method is performed by a first terminal and includes:

- reporting a first identifier set to a core network element, in which the first identifier set is configured to indicate at least one audio input signal format supported by a first terminal;
- in which, the first identifier set is used for determining, in combination with a second identifier set, an audio input signal format used by the first terminal and a second terminal during establishment of a communication link, the second identifier set is configured to indicate at least one audio input signal format supported by a second terminal, and the second identifier set is reported by the second terminal to the core network element.

According to a third aspect of the present disclosure, there is provided a core network element. The core network element includes:

- a processor; and
- a memory storing instructions executable by the processor.

The processor is configured to receive a first identifier set, and receive a second identifier set, in which the first identifier set is configured to indicate at least one audio input signal format supported by a first terminal, the first identifier set is reported by the first terminal, the second identifier set is configured to indicate at least one audio input signal format supported by a second terminal, and the second identifier set is reported by the second terminal; and

- negotiate and determine, based on the first identifier set and the second identifier set, an audio input signal format used by the first terminal and the second terminal during establishment of a communication link.

BRIEF DESCRIPTION OF THE DRAWINGS

To describe the technical solutions of the embodiments of the present disclosure more clearly, the following briefly introduces the accompanying drawings required for describing the embodiments.

DETAILED DESCRIPTION

Figure 1:
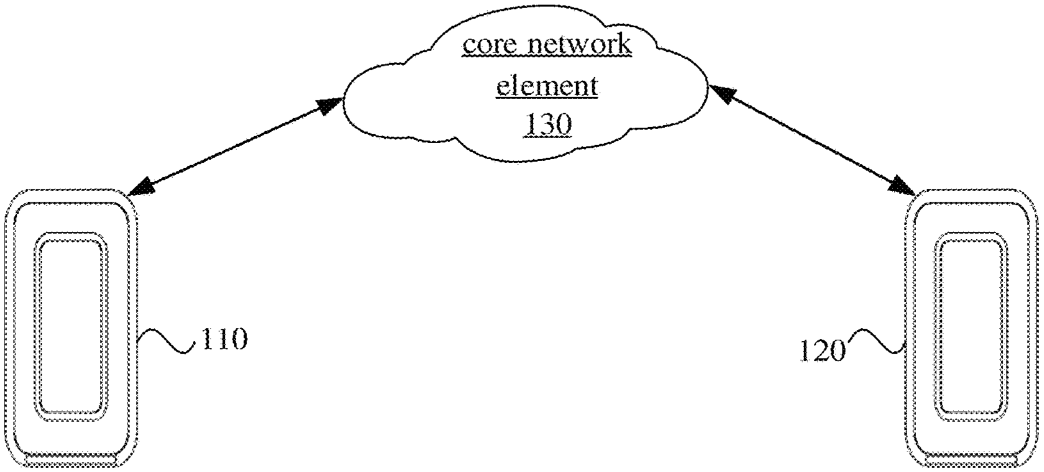
FIG. 1 is a schematic diagram of a communication system provided by an embodiment of the present disclosure.

To make the objectives, technical solutions, and advantages of the present disclosure clearer, the following further describes implementations of the present disclosure in detail with reference to the accompanying drawings.

The first-generation mobile communication technology (1G) began in the 1980s. 1G is the first-generation wireless cellular technology, which belongs to an analog mobile communication network.

When upgraded from 1G to 2G, a terminal device may be transferred from analog communication to digital communication. In China, the global system for mobile communication (GSM) network type is adopted. A voice encoder adopts an adaptive multi-rate (AMR) codec, an enhanced full rate (EFR) codec, a full rate (FR) codec, or a half rate (HR) codec, which performs communication to provide a single-channel narrowband voice service.

The 3G mobile communication system was proposed by the International Telecommunication Union (ITU) for international mobile communications in 2000. The China Mobile, China Telecom and China Unicom used an adaptive multi-rate wideband (AMR-WB) codec to provide a single-channel wideband voice service.

4G is a better improvement on the 3G technology. Data and voice are processed in an Internet Protocol (IP) mode, providing real-time services for voice and audio. A codec is adopted to consider the high-quality compression of both voice and audio.

The voice and audio communication services provided above extend from narrowband signals to ultra-wideband and even full-band services, but all are mono-track services. There is an increasing demand for high-quality audio, and stereo audio has a sense of orientation and distribution for each sound source and can improve the resolution compared to mono-track audio.

With the increase of transmission bandwidth, the upgrade of signal acquisition devices of terminal devices, the improvement of performances of signal processors, and the upgrade of terminal playback devices, three signal formats of track-based multi-channel signals, object-based signals and scene-based signals can provide a three-dimensional audio service codec and an immersive voice and audio services (IVAS) codec, which can support encoding and decoding requirements for the above three signal formats. The terminal devices that can support three-dimensional audio services include a mobile phone, a computer, a tablet computer, a conference system device, an augmented reality (AR) device, a virtual reality (VR) device, an automobile, etc.

Due to the structure and size of the terminal device, the number of microphones on the terminal device is limited. At present, there may be 1-4 microphones commonly used on the terminal device, and meanwhile the spatial layout between the microphones is also limited to a certain space range. Different terminal devices, due to the difference in the number of microphones and in spatial layout, make their capabilities to obtain an audio input signal format by using the conversion of the acquired audio signals different. Therefore, when two terminal devices establish communication, the core network element needs to negotiate, on the basis of the audio input signal format supported by the two terminal devices, an audio input signal format used to establish the communication.

FIG. 1 is a schematic diagram of a communication system provided by an embodiment of the present disclosure. The first terminal 110 is communicated with the second terminal 120 via a core network element 130.

The core network element 130 first acquires audio encoding and decoding capabilities supported by the first terminal 110 and the second terminal 120. When the two terminals perform negotiation to establish a communication link, the core network element 130 negotiates and determines, on the basis of the audio encoding and decoding capabilities supported by the first terminal 110 and the second terminal 120 and a network state, an audio codec used in the process of establishing the communication link.

A description is made by taking the first terminal 110 supporting AMR and AMR-WB codecs and the second terminal 120 supporting three codecs: AMR, AMR-WB and enhanced voice calling service (EVS) as an example.

For example, in a case that a network environment where the first terminal 110 and the second terminal 120 are located is relatively good, the core network element 130 performs negotiation to select AMR-WB as an codec used by the first terminal 110 and the second terminal 120 when establishing the communication, and the first terminal 110 and the second terminal 120 establish a wideband audio communication link using AMR-WB.

For example, in a case that a network environment where the first terminal 110 and the second terminal 120 are located is relatively bad, the core network element 130 performs negotiation to select WMR as a codec used by the first terminal 110 and the second terminal 120 when establishing the communication, and the first terminal 110 and the second terminal 120 establish a wideband audio communication link using AMR.

However, for some audio codecs, the terminal often cannot support all of its operating modes. In an implementation, the core network element 130 performs negotiation to use an IVAS audio codec by the first terminal 110 and the second terminal 120, but the first terminal 110 and the second terminal 120 cannot support all the operating modes of the IVAS. At this time, because the core network element 130 cannot acquire the audio input signal format supported by the first terminal 110 and the second terminal 120, the audio input signal format used by the first terminal 110 and the second terminal 120 when establishing the communication link cannot be determined.

How to determine the audio input signal format used by the first terminal 110 and the second terminal 120 during the establishment of the communication link needs to be discussed.

Figure 2:
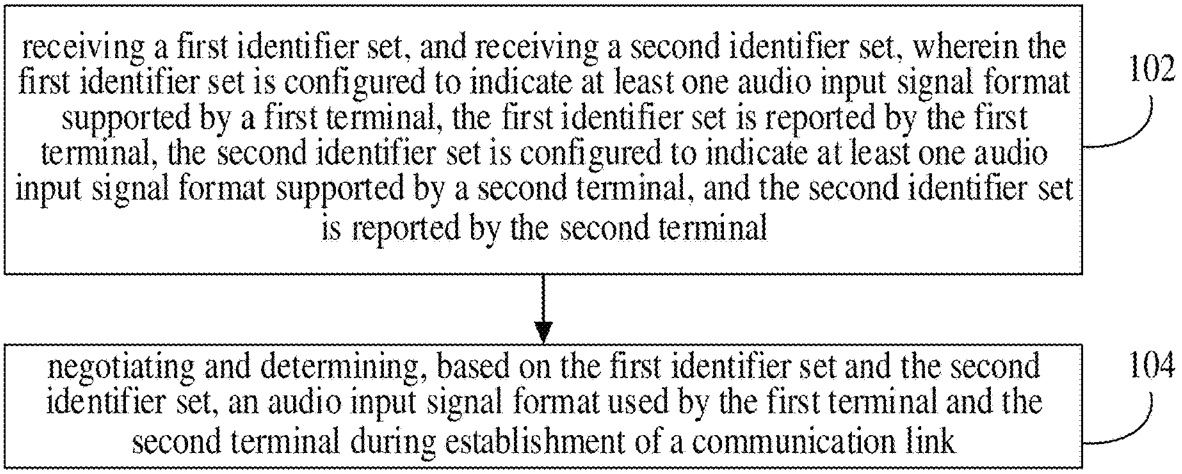
FIG. 2 is a flowchart of a method for capability determination provided by an embodiment of the present disclosure.

FIG. 2 shows a flowchart of a method for capability determination provided by an embodiment of the present disclosure, which is performed by the core network element 130 shown in FIG. 1 and includes the following steps 102-104.

Step 102, a first identifier set is received, and a second identifier set is received.

Schematically, the first identifier set is configured to indicate at least one audio input signal format supported by a first terminal, and the second identifier set is configured to indicate at least one audio input signal format supported by a second terminal.

The first identifier set is reported by the first terminal, and the second identifier set is reported by the second terminal.

According to the foregoing content, the terminal devices are limited by software and/or hardware, and their capabilities to acquire audio input signal formats are different, resulting in different audio input signal formats supported by the terminal devices.

Taking the first terminal as an example, a configuration structure of a microphone connected to the first terminal may be implemented in a variety of ways. For example, a single microphone or a plurality of microphones are built in the first terminal. For another example, the first terminal is externally connected to an audio signal acquisition device. For another example, one or more microphones are built in the first terminal, and the first terminal is externally connected to the audio signal acquisition device.

In a case that a single microphone is built in the first terminal, the audio input signal format that can be supported by the first terminal includes at least one of a mono-track signal and an object signal. The object signal includes a mono-track audio signal and a single-channel metadata signal.

In a case that a plurality of microphones are built in the first terminal, or that the first terminal is externally connected to the audio signal acquisition device, the audio input signal format that can be supported by the first terminal includes at least one of: a mono-track signal; a dual-track signal; a multi-track signal; an object signal; a metadata-assisted spatial audio (MASA) format signal; or a spatial audio signal. The object signal includes at least one track audio signal and one channel metadata signal. The spatial audio signal includes at least one of at least one track signal, a background signal or a metadata signal.

In a case that a single microphone or a plurality of microphones are built in the first terminal and the first terminal is externally connected to the audio signal acquisition device, the audio input signal format that can be supported by the first terminal includes at least one of: mono-track signal; a dual-track signal; a multi-track signal; an object signal; or a spatial audio signal. The object signal includes at least one track audio signal and one channel metadata signal. The spatial audio signal includes at least one of at least one track signal, a background signal or a metadata signal.

Schematically, each audio input signal format corresponds to a uniquely determined identifier. For example, the identifier for the mono-track signal is 1, and the identifier for the stereo signal is 2. It should be understood that the identifier corresponding to each audio input signal format may be set according to actual needs.

Referring to the following table, the embodiment of the present disclosure gives the following implementation:

| input signal format | identifier |
|---|---|
| mono-track signal | 1 |
| stereo signal | 2 |
| binaural signal | 3 |
| 5.1 multi-track signal | 4 |
| 5.1 + 4 multi-track signal | 5 |
| 7.1 multi-track signal | 6 |
| 7.1 + 4 multi-track signal | 7 |
| object signal | 8 |
| FOA signal | 9 |
| 2nd HOA signal | 10 |
| 3rd HOA signal | 11 |
| MASA signal | 12 |
| other spatial audio signals | 13 |

A multi-microphone signal is converted into a stereo signal or a 5.1, 7.1, 5.1+4 or 7.1+4 multi-track signal using the traditional beam-forming algorithm. The multi-microphone signal generates a MASA signal or other form of spatial audio signal through a parameter analysis algorithm.

In an implementation, the first identifier set is reported by the first terminal in response to accessing the network, and/or the second identifier set is reported by the second terminal in response to accessing the network.

According to the identifier corresponding to each audio input signal format, the first terminal and the second terminal can determine each identifier corresponding to at least one audio input signal format that are supported by themselves, so as to obtain the first identifier set and the second identifier set. For example, if the first terminal supports two audio input signal formats, i.e. a mono-track signal and a MASA signal, the first identifier set includes identifiers 1 and 12.

Subsequently, the first terminal reports the first identifier set to the core network element, and the second terminal also reports the second identifier set to the core network element. The timing of the first identifier set and/or the second identifier set may be the time when the first terminal and/or the second terminal are/is connected to the network.

Step 104, based on the first identifier set and the second identifier set, an audio input signal format used by the first terminal and the second terminal during establishment of a communication link is negotiated and determined.

After acquiring the first identifier set reported by the first terminal and the second identifier set reported by the second terminal, the core network element can determine at least one audio input signal format supported by the first terminal and the second terminal, respectively. Subsequently, the core network element may determine the audio input signal format used by the first terminal and the second terminal during the establishment of the communication link according to the negotiation strategy.

In summary, in the method for capability determination provided by the embodiment of the present disclosure, the core network element can negotiate and determine, based on the first identifier set and the second identifier set, the audio input signal format used by the two terminals during the establishment of the communication link by receiving the first identifier set reported by the first terminal and the second identifier set reported by the second terminal, thereby establishing a real-time communication service between the two terminals.

According to the foregoing content, the core network element determining the audio input signal format used by the first terminal and the second terminal during the establishment of the communication link according to the negotiation strategy may be implemented in a variety of ways. The embodiment of the present disclosure gives the following three implementations 1-3.

1. Negotiating and Determining a Same Audio Input Signal Format.

Figure 3:
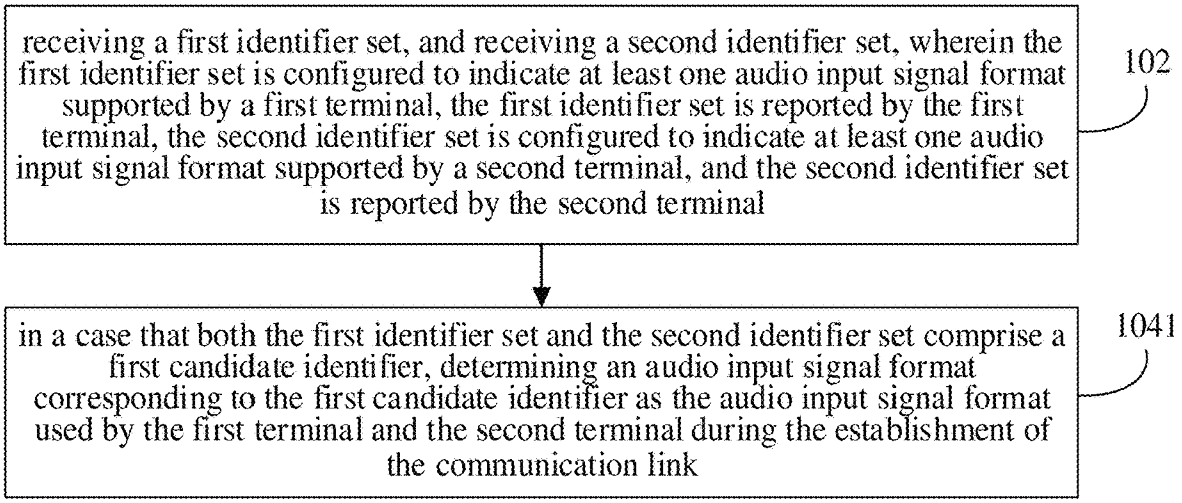
FIG. 3 is a flowchart of a method for capability determination provided by an embodiment of the present disclosure.

Referring to FIG. 2, FIG. 3 shows a flowchart of a method for capability determination provided by an embodiment of the present disclosure, in which step 104 may be implemented as step 1041, to be specific:

Step 1041, in a case that both the first identifier set and the second identifier set include a first candidate identifier, an audio input signal format corresponding to the first candidate identifier is determined as the audio input signal format used by the first terminal and the second terminal during establishment of a communication link.

The related description of the first identifier set and the second identifier set may refer to the above content and will not be repeated.

Schematically, the first candidate identifier is an identifier in the first identifier set and also an identifier in the second identifier set. In a case that both the first identifier set and the second identifier set include the first candidate identifier, both the first terminal and the second terminal support the audio input signal format corresponding to the first candidate identifier.

For example, the first identifier set includes identifiers 1, 7, and 12, the second identifier set includes identifiers 5 and 12, and the first candidate identifier is an identifier 12. After acquiring the first identifier set and the second identifier set, the core network element can determine that both the first terminal and the second terminal support the MASA signal corresponding to the identifier 12.

Subsequently, the core network element determines the MASA signal corresponding to the identifier 12 as the audio input signal format used by the first terminal and the second terminal during the establishment of the communication link.

2. Negotiating and Determining According to a Network State.

Figure 4:
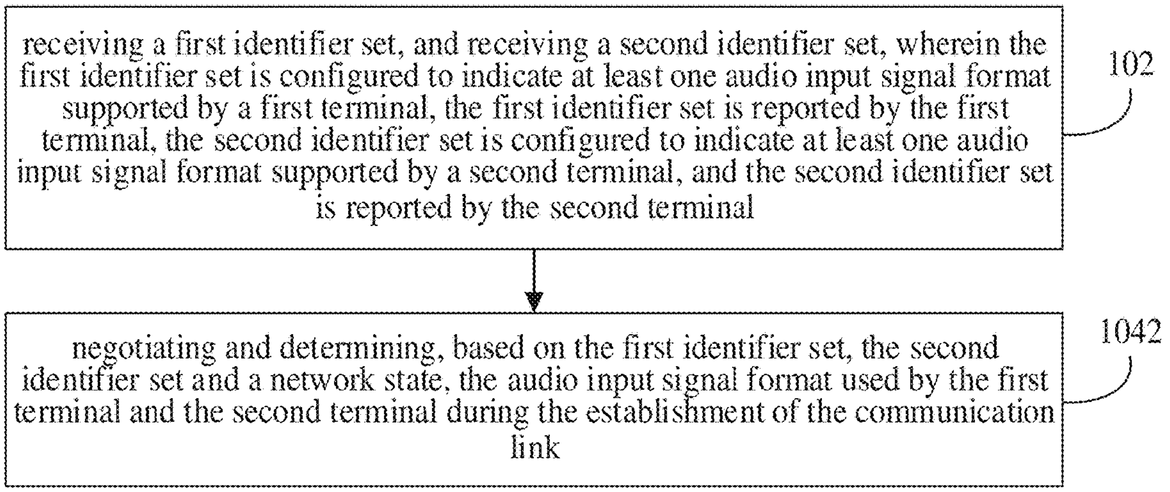
FIG. 4 is a flowchart of a method for capability determination provided by an embodiment of the present disclosure.

Referring to FIG. 2, FIG. 4 shows a flowchart of a method for capability determination provided by an embodiment of the present disclosure, in which step 104 may be implemented as step 1042, to be specific:

Step 1042, an audio input signal format used by the first terminal and the second terminal during establishment of a communication link is negotiated and determined based on the first identifier set, the second identifier set and a network state.

The related description of the first identifier set and the second identifier set may refer to the above content and will not be repeated.

Schematically, the network state is configured to indicate the excellence degree of the network when the first terminal and the second terminal establish the communication link. According to different network states, the core network element may negotiate and determine different audio input signal formats for the first terminal and the second terminal.

In an implementation, in a case that both the first identifier set and the second identifier set include a first candidate identifier and a second candidate identifier, step 1042 may be implemented as follows:

in a case that the network state is in a first condition, an audio input signal format corresponding to the first candidate identifier is determined as the audio input signal format used by the first terminal and the second terminal during the establishment of the communication link; and in a case that the network state is in a second condition, an audio input signal format corresponding to the second candidate identifier is determined as the audio input signal format used by the first terminal and the second terminal during the establishment of the communication link, in which the network in the first condition is better than the network in the second condition.

Schematically, the first candidate identifier and the second candidate identifier correspond to different audio input signal formats. When the network state is in different conditions, the determined audio input signal format may be set according to actual needs.

According to the foregoing content, identifiers 1-13 correspond to different audio input signal formats.

In an implementation, the first identifier set and the second identifier set may include two or more identical candidate identifiers. For example, both the first and second identifier sets include identifiers 1 and 12. At this time, the core network element may negotiate and determine, in combination with the network state, the audio input signal format used by the first terminal and the second terminal during the establishment of the communication link.

For example, the description is made by taking both the first identifier set and the second identifier set including identifiers 1 and 12, the network in the first condition being in a good condition and the network in the second condition being in a poor condition as an example. After acquiring the first identifier set and the second identifier set, the core network element can determine that both the first terminal and the second terminal support a mono-track signal and a MASA signal.

Subsequently, in a case that the network is in the first condition, the core network element negotiates and determines the MASA signal corresponding to the identifier 12 as the audio input signal format used by the first terminal and the second terminal during the establishment of the communication link; and in a case that the network is in the second condition, the core network element negotiates and determines the mono-track signal corresponding to the identifier 1 as the audio input signal format used by the first terminal and the second terminal during the establishment of the communication link.

3. Negotiating and Determining Different Audio Input Signal Formats.

Figure 5:
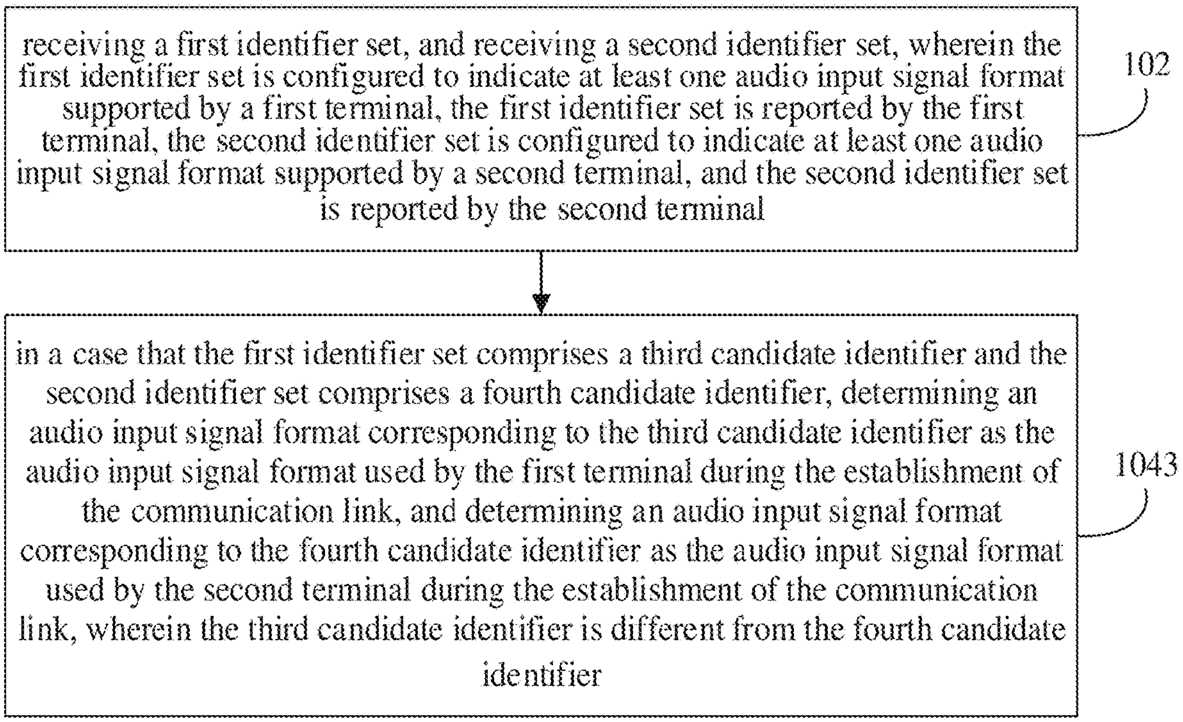
FIG. 5 is a flowchart of a method for capability determination provided by an embodiment of the present disclosure.

Referring to FIG. 2, FIG. 5 shows a flowchart of a method for capability determination provided by an embodiment of the present disclosure, in which step 104 may be implemented as step 1043, to be specific:

step 1043, in a case that the first identifier set includes a third candidate identifier and the second identifier set includes a fourth candidate identifier, an audio input signal format corresponding to the third candidate identifier is determined as the audio input signal format used by the first terminal during the establishment of the communication link, and an audio input signal format corresponding to the fourth candidate identifier is determined as the audio input signal format used by the second terminal during the establishment of the communication link.

The third candidate identifier is different from the fourth candidate identifier. The related description of the first identifier set and the second identifier set may refer to the above content and will not be repeated.

According to the foregoing content, when the first terminal and the second terminal intend to establish the communication link, the core network element may negotiate and determine the use of different audio input signal formats for the first terminal and the second terminal, so as to realize a real-time communication service between two terminal devices.

The description is made by taking both the first identifier set and the second identifier set including identifiers 1, 7 and 12 as an example. After acquiring the first identifier set and the second identifier set, the core network element can determine that both the first terminal and the second terminal support a mono-track signal, 7.1+4 a multi-track signal and a MASA signal. Subsequently, the core network element may determine different audio input signal formats for the first terminal and the second terminal, respectively.

For example, the third candidate identifier is the identifier 1, and the fourth candidate identifier is the identifier 7. The core network element determines the mono-track signal corresponding to the identifier 1 as the audio input signal format that is to be used when the first terminal establishes the communication link; and determines the 7.1+4 multi-track signal corresponding to the identifier 7 as the audio input signal format that is to be used when the second terminal establishes the communication link.

In an implementation, the core network element also needs to determine the third candidate identifier and the fourth candidate identifier before negotiating and determining the used audio input signal format for the first terminal and the second terminal.

In an implementation, the first terminal and the second terminal report their respective audio playback format capabilities to the core network element, respectively.

In an implementation, the method for capability determination provided by the embodiment of the present disclosure further includes:

determining the fourth candidate identifier according to an audio playback format capability possessed by the first terminal; and determining the third candidate identifier according to an audio playback format capability possessed by the second terminal.

The audio playback format includes at least one of: a headphone signal format; or a speaker signal format.

In an implementation, the headphone signal format includes at least one of: a mono-track signal format; a stereo signal format; or a binaural signal format.

Both the stereo signal and the binaural signal are a dual-track signal. The stereo signal is a conventional dual-track signal. The binaural signal refers to a dual-track signal recorded using an artificial head model or real ears.

In an implementation, the speaker signal format includes at least one of: a mono-track signal format; a multi-track signal format.

It should be understood that the mono-track signal may be played through headphones or through a speaker. The stereo signal and the binaural signal may be played through headphones. The multi-track signal may be played through a speaker.

In an implementation, the multi-track signal format includes at least one of the following formats: a dual-track signal format (2.0), a six-track signal format (5.1), an eight-track signal format (7.1), a ten-track signal format (5.1+4), and a twelve-track signal format (7.1+4).

Again, the description is made by taking both the first identifier set and the second identifier set including identifiers 1, 7 and 12 as an example.

It is supposed that the first terminal has a capability of playing back an audio signal format of the 7.1+4 multi-track signal, and the second terminal has a capability of playing back an audio signal format of the stereo signal. Subsequently, when the first terminal and the second terminal establish the communication link, the core network element determines the MASA signal corresponding to the identifier 12 as the audio input signal format that is to be used by the first terminal; and determines the 7.1+4 multi-track signal corresponding to the identifier 7 as the audio input signal format that is to be used by the second terminal.

In an implementation, similar to the case where both the first identifier set and the second identifier set include two or more identifiers, the first terminal and the second terminal may have two or more audio playback format capabilities. At this time, the core network element may negotiate and determine, in combination with the network state, the audio input signal format used by the first terminal and the second terminal during the establishment of the communication link.

The process of the core network element negotiating and determining, in combination with the network state, the audio input signal format is similar to the above-mentioned content, which may be used as a reference and will not be repeated. The audio input signal format negotiated and determined in combination with the network state may be set according to actual needs, and will not be limited in the present disclosure.

In summary, in the method for capability determination provided by the embodiment of the present disclosure, three implementation methods for negotiating and determining the audio input signal format are given.

In an implementation, in a case that the first identifier set and the second identifier set include the same identifier, the same audio input signal format is negotiated and determined for the first terminal and the second terminal.

In an implementation, on the basis of the first identifier set, the second identifier set and the network state, an audio input signal format used by the first terminal and the second terminal during the establishment of the communication link is negotiated and determined.

In an implementation, in a case that the first identifier set and the second identifier set include different identifiers, different audio input signal formats are negotiated and determined for the first terminal and the second terminal.

It should be understood that the three implementation methods provided by the embodiment of the present disclosure can be used in combination, which will not be limited in the present disclosure.

For example, in a case that the first identifier set and the second identifier set include two or more identical identifiers, the core network element negotiates and determines, on the basis of the first identifier set, the second identifier set and the network state, the audio input signal format.

For another example, in a case that both the first terminal and the second terminal support two or more audio playback format capabilities, the core network element negotiates and determines, on the basis of the first identifier set, the second identifier set and the network state, the audio input signal format.

Figure 6:
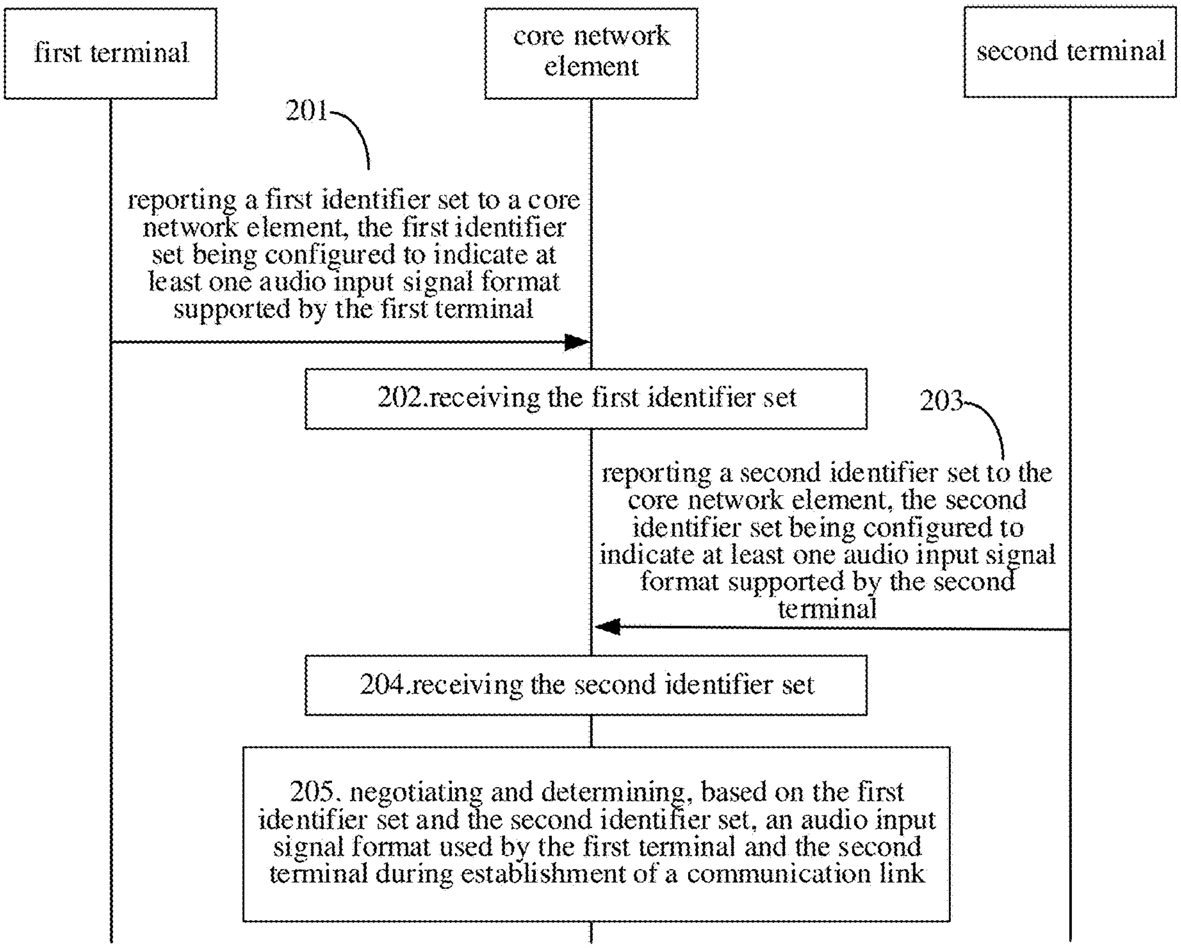
FIG. 6 is a flowchart of a method for capability determination and capability reporting provided by an embodiment of the present disclosure.

FIG. 6 shows a flowchart of capability determination and reporting methods provided by an embodiment of the present disclosure, which are performed by the communication system shown in FIG. 1. The method for capability determination is performed by the core network element 130 in FIG. 1. The method for capability reporting is performed by the first terminal 110 and the second terminal 120 in FIG. 1. The capability determination and reporting include the following step 201.

Step 201, a first identifier set is reported by the first terminal to the core network element.

Schematically, the first terminal reports the first identifier set to the core network element in response to accessing a network.

Schematically, the first identifier set is configured to indicate at least one audio input signal format supported by the first terminal.

According to the foregoing content, the terminal devices are limited by software and/or hardware, and their capabilities to acquire audio input signal formats are different, resulting in different audio input signal formats supported by the terminal devices.

Figure 7:
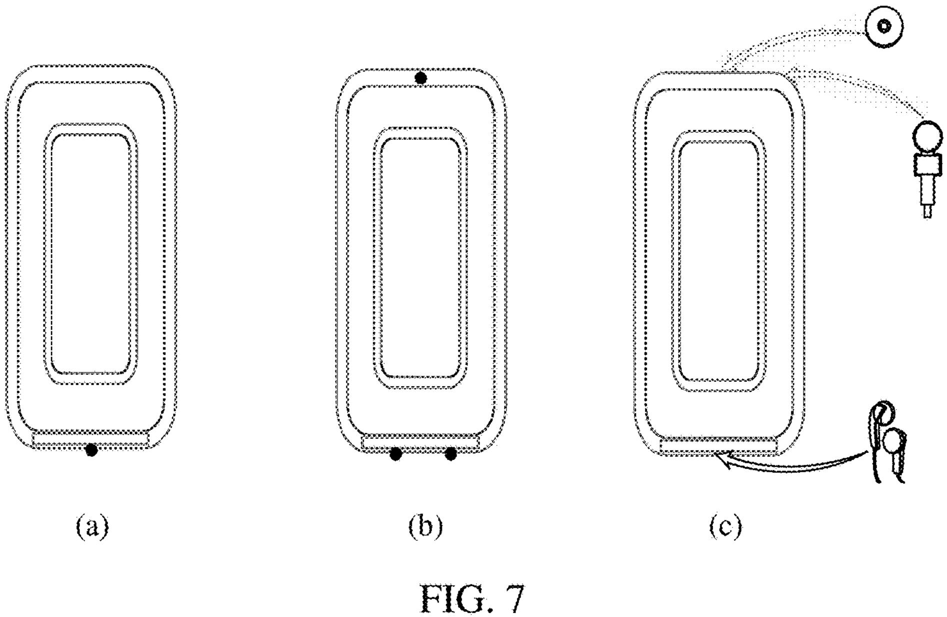
FIG. 7 shows schematic diagrams (a), (b), and (c) of terminal devices provided by embodiments of the present disclosure.

FIG. 7 is a schematic diagram of a terminal device provided by an embodiment of the present disclosure.

According to the foregoing content, a configuration structure of a microphone connected to the first terminal may be implemented in a variety of ways.

For example, a single microphone is built in the first terminal. As shown in (a) in FIG. 7, the single microphone is arranged at a black dot. For another example, a plurality of microphones are built in the first terminal. As shown in (b) in FIG. 7, the plurality of microphones is respectively arranged at black dots. For another example, the first terminal is externally connected to an audio signal acquisition device. For another example, a single microphone or a plurality of microphones are built in the first terminal and the first terminal is externally connected to the audio signal acquisition device, as shown in (c) in FIG. 7.

In an implementation, the external audio signal acquisition device includes at least one of: an audio signal acquisition ball; a microphone audio acquisition array; a control-by-wire headphone. The audio signal acquisition ball may be a first-order ambisonics (FOA) audio signal acquisition ball or a higher-order ambisonics (HOA) audio signal acquisition ball.

In a case that a single microphone is built in the first terminal, the audio input signal format that can be supported by the first terminal includes at least one of a mono-track signal and an object signal. The object signal includes a mono-track audio signal and a single-channel metadata signal.

In a case that a plurality of microphones are built in the first terminal, or that the first terminal is externally connected to the audio signal acquisition device, the audio input signal format that can be supported by the first terminal includes at least one of: a mono-track signal; a dual-track signal; a multi-track signal; an object signal; a metadata-assisted spatial audio (MASA) format signal; or a spatial audio signal. The object signal includes at least one track audio signal and one channel metadata signal. The spatial audio signal includes at least one of at least one track signal, a background signal or a metadata signal.

In a case that one or more microphones are built in the first terminal and the first terminal is externally connected to the audio signal acquisition device, the audio input signal format that can be supported by the first terminal includes at least one of: a mono-track signal; a dual-track signal; a multi-track signal; an object signal; or a spatial audio signal. The object signal includes at least one track audio signal and one channel metadata signal. The spatial audio signal includes at least one of at least one track signal, a background signal or a metadata signal.

According to the foregoing content, each audio input signal format corresponds to a uniquely determined identifier.

The first terminal may determine the corresponding identifier according to the audio input signal format supported by the first terminal, then determine the first identifier set according to the identifier, and send the first identifier set to the core network element.

In an implementation, when the timing of reporting the first identifier set may be the time when the first terminal is connected to the network, step 201 may be implemented as follows:

the first terminal reports the first identifier set to the core network element in response to accessing the network.

Step 202, the first identifier set reported by the first terminal is received by the core network element.

Schematically, the first identifier set is used for determining, in combination with a second identifier set, the audio input signal format used by the first device and a second device during establishment of a communication link, the second identifier set is configured to indicate at least one audio input signal format supported by the second terminal, and the second identifier set is reported by the second terminal to the core network element.

The related description of the first identifier set and the second identifier set may refer to the above content and will not be repeated.

Step 203, a second identifier set is reported by the second terminal to the core network element.

Schematically, the second terminal reports the second identifier set to the core network element in response to accessing the network.

Schematically, the second identifier set is configured to indicate at least one audio input signal format supported by the second terminal.

The determination of the identifier corresponding to the audio input signal format supported by the second terminal is similar to the determination of the identifier corresponding to the audio input signal format supported by the first terminal. The determination of the second identifier set is similar to the determination of the first identifier set and may be used as a reference.

In an implementation, when the timing of reporting the second identifier set may be the time in response to the second terminal accessing a network, step 203 may be implemented as follows:

the second terminal reports the second identifier set to the core network element in response to accessing the network.

Step 204, the second identifier set reported by the second terminal is received by the core network element.

The related description of the second identifier set may refer to the foregoing content and will not be repeated.

Step 205, an audio input signal format used by the first terminal and the second terminal during the establishment of the communication link is negotiated and determined by the core network element based on the first identifier set and the second identifier set.

Schematically, step 205 is similar to step 104, which may be used as a reference and will not be repeated.

In summary, the method for capability determination provided by the embodiment of the present disclosure is performed by the core network element, and the method for capability reporting is performed by the first terminal and the second terminal. After the first terminal reports the first identifier set and the second terminal reports the second identifier set, the core network element can acquire at least one audio input signal format supported by the first terminal and the second terminal; and based on the first identifier set and the second identifier set, negotiate and determine the audio input signal format used by the first terminal and the second terminal during the establishment of the communication link.

Figure 8:
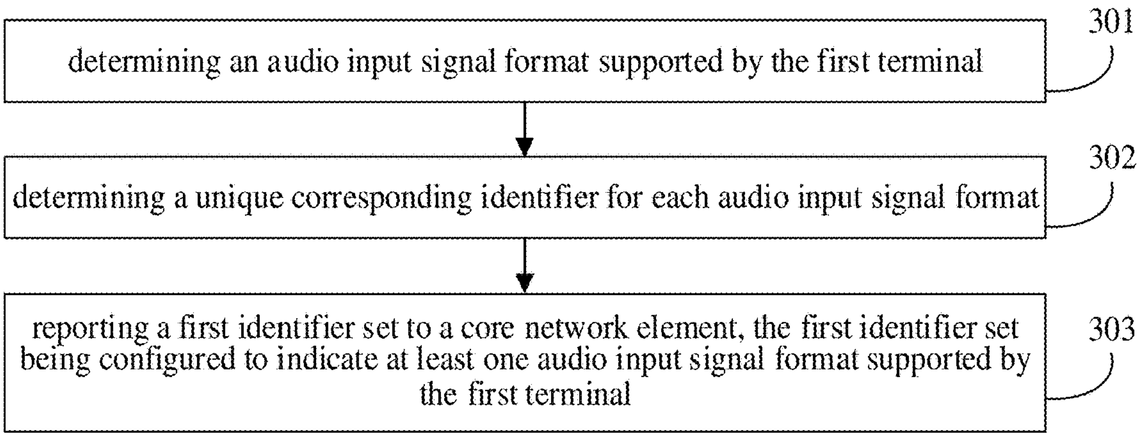
FIG. 8 is a flowchart of a method for capability reporting provided by an embodiment of the present disclosure.

FIG. 8 shows a flowchart of a method for capability reporting provided by an embodiment of the present disclosure, which is performed by the first terminal 110 shown in FIG. 1. The method includes the following steps 301-303.

Step 301, an audio input signal format supported by the first terminal is determined.

According to the foregoing content, based on software and/or hardware limitations of the terminal devices, the audio input signal formats supported by the terminal devices are also different. It should be understood that the embodiment of the present disclosure only takes the first terminal as an example, and the process of determining the audio input signal format supported by the second terminal is similar to that of the first terminal, and will not be repeated.

In an implementation, step 301 may be implemented as follows:

the audio input signal format supported by the first terminal is determined according to an audio acquisition device connected to the first terminal and a software processing algorithm capability possessed by the first terminal.

The audio acquisition device connected to the first terminal may be built-in or external. The software processing algorithm capability possessed by the first terminal varies according to different audio acquisition devices.

In an implementation, the audio acquisition device includes at least one of: a single built-in microphone; a plurality of built-in microphones; or an external audio signal acquisition device.

In an implementation, the external audio signal acquisition device includes at least one of: an audio signal acquisition ball; a microphone audio acquisition array; a control-by-wire headphone.

In an implementation, the software processing algorithm capability includes at least one of:

converting a signal acquired by a plurality of built-in microphones into one of a stereo signal, an object signal, or a spatial audio signal;

converting a signal acquired by an external audio signal acquisition ball into a spatial audio signal;

converting a signal acquired by a plurality of built-in microphones and a signal acquired by an external audio signal acquisition device into one of a stereo signal, an object signal, or a spatial audio signal; or converting a signal acquired by a plurality of built-in microphones into a MASA signal or another form of spatial audio signal through parameter analysis.

Step 302, a unique corresponding identifier for each audio input signal format is determined.

According to the foregoing content, each audio input signal format corresponds to a uniquely determined identifier, and one audio input signal format corresponds to one identifier. After determining the supported audio input signal format, the first terminal may determine the corresponding identifier for each audio input signal format.

It should be understood that the embodiment of the present disclosure only takes the first terminal as an example, and the process of determining the identifier by the second terminal is similar to that of the first terminal, and will not be repeated.

Step 303: the first identifier set is reported to a core network element, in which the first identifier set is configured to indicate at least one audio input signal format supported by the first terminal.

Schematically, the first terminal reports the first identifier set to the core network element in response to accessing a network.

Schematically, step 303 is identical to step 201 which may be used as a reference, and will not be repeated.

In an implementation, in a case that the core network element performs, on the basis of the audio playback format capability possessed by the first terminal and the second terminal, different audio input signal formats are negotiated and determined for the first terminal and the second terminal, and the first terminal and the second terminal also need to report their own audio playback format capabilities.

Taking the first terminal as an example, the method for capability reporting provided by the embodiment of the present disclosure further includes:

reporting the audio playback format capability possessed by the first terminal to the core network element.

In an implementation, the audio playback format includes at least one of: a headphone signal format; or a speaker signal format.

In an implementation, the headphone signal format includes at least one of: a mono-track signal format; a stereo signal format; or a binaural signal format.

In an implementation, the speaker signal format includes at least one of: a mono-track signal format; a multi-track signal format.

In an implementation, the multi-track signal format includes at least one of the following formats: a dual-track signal format (2.0), a six-track signal format (5.1), an eight-track signal format (7.1), a ten-track signal format (5.1+4), and a twelve-track signal format (7.1+4).

The related description of the headphone signal format and the speaker signal format may refer to the above content and will not be repeated.

In summary, in the method for capability reporting provided by the embodiment of the present disclosure, a determination process of the first terminal to determine the identifier corresponding to the supported audio input signal format is given, and the identifier set is reported in response to accessing the network, so that the core network element can be informed of the audio input signal format supported by the terminal device, thereby realizing communication with other terminals.

In an implementation, the embodiment of the present disclosure further provides a process of the first terminal to report its own audio playback format capability.

According to the foregoing content, the embodiment of the present disclosure provides the following specific process for capability reporting and determination, which is used for the core network element to negotiate and determine the audio input signal format used by the first terminal and the second terminal in the process of establishing the communication link.

1. The First Terminal and the Second Terminal Respectively Determine the Audio Input Signal Format that can be Supported by Themselves, and Determine a Unique Identifier for the Supported Audio Input Signal Format.

In an implementation, the first terminal and the second terminal determining the audio input signal format that can be supported by themselves may be implemented as follows:

the audio input signal format supported by the first terminal is determined according to an audio acquisition device connected to the first terminal and a software processing algorithm capability possessed by the first terminal; and the audio input signal format supported by the second terminal is determined on the basis of an audio acquisition device connected to the second terminal and a software processing algorithm capability possessed by the second terminal.

In an implementation, the audio acquisition device includes at least one of: a single built-in microphone; a plurality of built-in microphones; or an external audio signal acquisition device.

In an implementation, the external audio signal acquisition device includes at least one of: an audio signal acquisition ball; a microphone audio acquisition array; a control-by-wire headphone. The audio signal acquisition ball may be an FOA audio signal acquisition ball or an HOA audio signal acquisition ball. The shape of the microphone audio acquisition array may be determined according to actual needs, and will not be limited in the present disclosure.

In an implementation, the software processing algorithm capability includes at least one of:

converting a signal acquired by a plurality of built-in microphones into one of a stereo signal, an object signal, or a spatial audio signal;

converting a signal acquired by an external audio signal acquisition ball into a spatial audio signal;

converting a signal acquired by a plurality of built-in microphones and a signal acquired by an external audio signal acquisition device into one of a stereo signal, an object signal, or a spatial audio signal; or converting a signal acquired by a plurality of built-in microphones into a MASA signal or another form of spatial audio signal through parameter analysis.

The process of determining the identifier may refer to the foregoing content and will not be repeated.

2. The First Terminal Reports the First Identifier Set to the Core Network Element, and the Second Terminal Reports the Second Identifier Set to the Core Network Element.

When the first terminal is connected to the network, the first terminal and the second terminal report the first identifier set and the second identifier set to the core network element.

The first identifier set is configured to indicate at least one audio input signal format supported by the first terminal, and the second identifier set is configured to indicate at least one audio input signal format supported by the second terminal. The first identifier set and the second identifier set include at least one candidate identifier.

After receiving the first identifier set and the second identifier set, the core network element may determine the audio input signal format supported by the first terminal and the second terminal.

In an implementation, the first terminal reports the first identifier set to the core network element in response to accessing the network, and the second terminal reports the second identifier set to the core network element in response to accessing the network.

3. The Core Network Element Negotiates and Determines, Based on the First Identifier Set and the Second Identifier Set, an Audio Input Signal Format Used by the First Terminal and the Second Terminal During Establishment of a Communication Link.

When negotiating and determining the audio input signal format, the core network element may negotiate and determine the same audio input signal format or different audio input signal formats.

In an implementation, in a case that both the first identifier set and the second identifier set include a first candidate identifier, an audio input signal format corresponding to the first candidate identifier is determined as the audio input signal format used by the first terminal and the second terminal during the establishment of the communication link.

In an implementation, an audio input signal format used by the first terminal and the second terminal during the establishment of the communication link is negotiated and determined on the basis of the first identifier set, the second identifier set and the network state.

Depending on different network states, the audio input signal formats negotiated and determined by the core network element for the first terminal and the second terminal are also different.

In an implementation, in a case that the network state is in a first condition, the audio input signal format corresponding to the first candidate identifier is determined as the audio input signal format used by the first terminal and the second terminal during the establishment of the communication link. In a case that the network state is in a second condition, the audio input signal format corresponding to the second candidate identifier is determined as the audio input signal format used by the first terminal and the second terminal during the establishment of the communication link. The network in the first condition is better than the network in the second condition.

In an implementation, in a case that the first identifier set includes a third candidate identifier and the second identifier set includes a fourth candidate identifier, an audio input signal format corresponding to the third candidate identifier is determined as the audio input signal format used by the first terminal during the establishment of the communication link, and an audio input signal format corresponding to the fourth candidate identifier is determined as the audio input signal format used by the second terminal during the establishment of the communication link, in which the third candidate identifier is different from the fourth candidate identifier.

The core network element also needs to determine the third candidate identifier and the fourth candidate identifier before negotiating and determining the used audio input signal format for the first terminal and the second terminal. In an implementation, the fourth candidate identifier is determined according to the audio playback format capability possessed by the first terminal; and the third candidate identifier is determined according to the audio playback format capability possessed by the second terminal.

In an implementation, the audio playback format capabilities possessed by the first terminal and the second terminal include at least one of: a headphone signal format; or a speaker signal format.

In an implementation, the headphone signal format includes at least one of: a mono-track signal format; a stereo signal format; or a binaural signal format.

In an implementation, the speaker signal format includes at least one of: a mono-track signal format; a multi-track signal format.

In an implementation, the multi-track signal format includes at least one of the following formats: a dual-track signal format (2.0), a six-track signal format (5.1), an eight-track signal format (7.1), a ten-track signal format (5.1+4), and a twelve-track signal format (7.1+4).

The following is an apparatus embodiment of the present disclosure. The details that are not described in detail in the apparatus embodiment may refer to the corresponding records in the above method embodiment, and will not be repeated herein.

Figure 9:
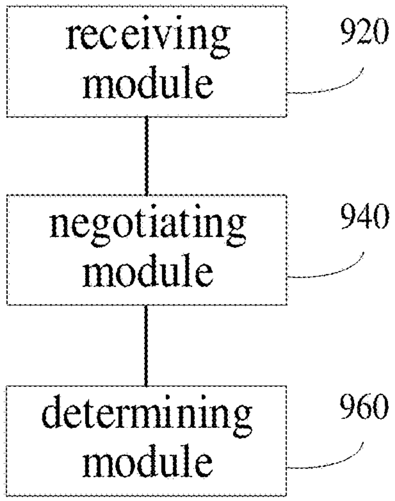
FIG. 9 is a schematic diagram of an apparatus for capability determination provided by an embodiment of the present disclosure.

FIG. 9 shows a structural diagram of an apparatus for capability determination provided by an embodiment of the present disclosure. The apparatus includes:

- a receiving module 920, configured to receive a first identifier set, and receive a second identifier set, in which the first identifier set is configured to indicate at least one audio input signal format supported by a first terminal, the first identifier set is reported by the first terminal, the second identifier set is configured to indicate at least one audio input signal format supported by a second terminal, and the second identifier set is reported by the second terminal; and
- a negotiating module 940, configured to negotiate and determine, based on the first identifier set and the second identifier set, an audio input signal format used by the first terminal and the second terminal during establishment of a communication link.

In an implementation, the first identifier set is reported by the first terminal in response to accessing the network, and/or the second identifier set is reported by the second terminal in response to accessing the network.

In an implementation, the negotiating module 940 is configured to, in a case that both the first identifier set and the second identifier set include a first candidate identifier, determine an audio input signal format corresponding to the first candidate identifier as the audio input signal format used by the first terminal and the second terminal during the establishment of the communication link.

In an implementation, the negotiating module 940 is configured to negotiate and determine, based on the first identifier set, the second identifier set and a network state, the audio input signal format used by the first terminal and the second terminal during the establishment of the communication link.

In an implementation, both the first identifier set and the second identifier set include a first candidate identifier and a second candidate identifier. The negotiating module 940 is configured to, in a case that the network state is in a first condition, determine an audio input signal format corresponding to the first candidate identifier as the audio input signal format used by the first terminal and the second terminal during the establishment of the communication link; and in a case that the network state is in a second condition, determine an audio input signal format corresponding to the second candidate identifier as the audio input signal format used by the first terminal and the second terminal during the establishment of the communication link, in which the network in the first condition is better than the network in the second condition.

In an implementation, the negotiating module 940 is configured to, in a case that the first identifier set includes a third candidate identifier and the second identifier set includes a fourth candidate identifier, determine an audio input signal format corresponding to the third candidate identifier as the audio input signal format used by the first terminal during the establishment of the communication link, and determine an audio input signal format corresponding to the fourth candidate identifier as the audio input signal format used by the second terminal during the establishment of the communication link, in which the third candidate identifier is different from the fourth candidate identifier.

In an implementation, the apparatus further includes a determining module 960, configured to determine the fourth candidate identifier according to an audio playback format capability possessed by the first terminal; and determine the third candidate identifier according to an audio playback format capability possessed by the second terminal.

In an implementation, the audio playback format includes at least one of: a headphone signal format; or a speaker signal format.

In an implementation, the headphone signal format includes at least one of: a mono-track signal format; a stereo signal format; or a binaural signal format.

In an implementation, the speaker signal format includes at least one of: a mono-track signal format; a multi-track signal format.

Figure 10:
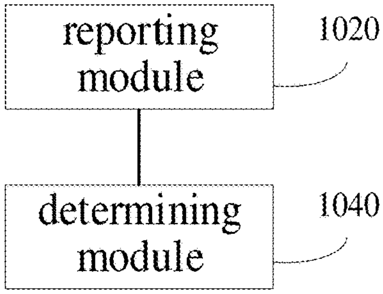
FIG. 10 is a schematic diagram of an apparatus for capability reporting provided by an embodiment of the present disclosure.

FIG. 10 shows a schematic diagram of an apparatus for capability reporting provided by an embodiment of the present disclosure. The apparatus includes:

- a reporting module 1020, configured to report a first identifier set to a core network element, in which the first identifier set is configured to indicate at least one audio input signal format supported by the first terminal.

Schematically, the first terminal reports the first identifier set to the core network element in response to accessing a network.

- in which, the first identifier set is used for determining, in combination with a second identifier set, an audio input signal format used by the first terminal and a second terminal during establishment of a communication link, the second identifier set is configured to indicate at least one audio input signal format supported by a second terminal, and the second identifier set is reported by the second terminal to the core network element.

In an implementation, the reporting module 1020 is configured to report the first identifier set to the core network element in response to accessing the network.

In an implementation, the apparatus further includes a determining module 1040, configured to determine the audio input signal format supported by the first terminal; and determine a unique corresponding identifier for each audio input signal format.

In an implementation, the determining module 1040 is configured to determine the audio input signal format supported by the first terminal according to an audio acquisition device connected to the first terminal and a software processing algorithm capability possessed by the first terminal.

In an implementation, the audio acquisition device includes at least one of: a single built-in microphone; a plurality of built-in microphones; or an external audio signal acquisition device.

In an implementation, the external audio signal acquisition device includes at least one of: an audio signal acquisition ball; a microphone audio acquisition array; a control-by-wire headphone.

In an implementation, the software processing algorithm capability includes at least one of: converting a signal acquired by a plurality of built-in microphones into one of a stereo signal, an object signal, or a spatial audio signal; converting a signal acquired by an external audio signal acquisition ball into a spatial audio signal; converting a signal acquired by a plurality of built-in microphones and a signal acquired by an external audio signal acquisition device into one of a stereo signal, an object signal, or a spatial audio signal; or converting a signal acquired by a plurality of built-in microphones into a MASA signal or another form of spatial audio signal through parameter analysis.

In an implementation, the reporting module 1020 is further configured to report an audio playback format capability possessed by the first terminal to the core network element.

In an implementation, the audio playback format includes at least one of: a headphone signal format; or a speaker signal format.

In an implementation, the headphone signal format includes at least one of: a mono-track signal format; a stereo signal format; or a binaural signal format.

In an implementation, the speaker signal format includes at least one of: a mono-track signal format; a multi-track signal format.

In an implementation, in a case that a single microphone is built in the first terminal, the audio input signal format supported by the first terminal includes at least one of a mono-track signal and an object signal.

In an implementation, the object signal includes a mono-track audio signal and a single-channel metadata signal.

In an implementation, in a case that a plurality of microphones are built in the first terminal or the first terminal is externally connected to the audio signal acquisition device, the audio input signal format that can be supported by the first terminal includes at least one of: a mono-track signal; a dual-track signal; a multi-track signal; an object signal; a MASA format signal; or a spatial audio signal.

In an implementation, in a case that one or more microphones are built in the first terminal and the first terminal is externally connected to the audio signal acquisition device, the audio input signal format that can be supported by the first terminal includes at least one of: a mono-track signal; a dual-track signal; a multi-track signal; an object signal; or a spatial audio signal.

In an implementation, the object signal includes at least one track audio signal and one channel metadata signal.

In an implementation, the spatial audio signal includes at least one of: at least one track signal; a background signal; or a metadata signal.

Figure 11:
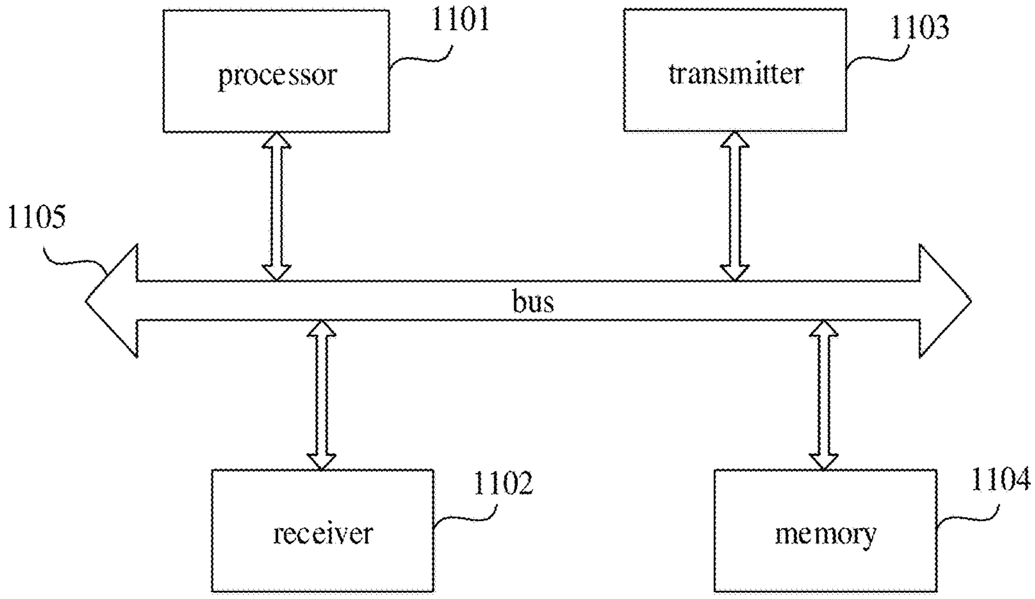
FIG. 11 is a schematic structural diagram of a communication device provided by an embodiment of the present disclosure.

FIG. 11 shows a schematic structural diagram of a communication device (a terminal or a network device) provided by an embodiment of the present disclosure. The communication device includes a processor 1101, a receiver 1102, a transmitter 1103, a memory 1104, and a bus 1105.

The processor 1101 includes one or more processing cores. The processor 1101 executes various functional applications and data processing by running software programs and modules.

The receiver 1102 and the transmitter 1103 may be implemented as a communication component, which may be a communication chip.

The memory 1104 is connected to the processor 1101 via the bus 1105.

The memory 1104 may be configured to store at least one instruction therein. The processor 1101 is configured to execute the at least one instruction to implement the steps in the method for capability determination or method for capability reporting mentioned in the method embodiments above.

In addition, the memory 1104 may be implemented by any type of volatile or non-volatile storage device, or a combination thereof, including, but not limited to, a magnetic disk or optical disk, an electrically-erasable programmable read only memory (EEPROM), an erasable programmable read only memory (EPROM), a static random access memory (SRAM), a read-only memory (ROM), a magnetic memory, a flash memory, or a programmable read-only memory (PROM).

An embodiment of the present disclosure further provides a core network element. The core network element includes a transceiver and a processor. The transceiver is configured to receive a first identifier set, and receive a second identifier set, in which the first identifier set is configured to indicate at least one audio input signal format supported by a first terminal, the first identifier set is reported by the first terminal, the second identifier set is configured to indicate at least one audio input signal format supported by a second terminal, and the second identifier set is reported by the second terminal; and the processor is configured to negotiate and determine, based on the first identifier set and the second identifier set, an audio input signal format used by the first terminal and the second terminal during establishment of a communication link.

An embodiment of the present disclosure further provides a first terminal. The first terminal includes a transceiver. The transceiver is configured to report a first identifier set to a core network element, in which the first identifier set is configured to indicate at least one audio input signal format supported by the first terminal;

in which, the first identifier set is used for determining, in combination with a second identifier set, an audio input signal format used by the first terminal and a second terminal during establishment of a communication link, the second identifier set is configured to indicate at least one audio input signal format supported by a second terminal, and the second identifier set is reported by the second terminal to the core network element.

An embodiment of the present disclosure further provides a computer-readable storage medium. The storage medium is configured to store a computer program therein, in which the computer program, when executed by a processor, implements the method for capability determination or the method for capability reporting described above.

An embodiment of the present disclosure further provides a chip. The chip includes a programmable logic circuit and/or a program instruction that, when the chip is running, is used for implementing the method for capability determination or the method for capability reporting described above.

An embodiment of the present disclosure further provides a computer program product or a computer program. The computer program product or the computer program includes a computer instruction, which is stored in a computer-readable storage medium, in which a processor reads the computer instruction from the computer-readable storage medium and performs the computer instruction, so as to implement the method for capability determination or the method for capability reporting described above.

The foregoing descriptions are merely embodiments of the present disclosure, and are not intended to limit the present disclosure. Within the spirit and principles of the present disclosure, any modifications, equivalent substitutions, improvements, etc., are within the protection scope of the present disclosure.

The invention claimed is:

1. A method for capability determination, performed by a core network device, comprising:

receiving a first identifier set, and receiving a second identifier set, wherein the first identifier set is configured to indicate at least one audio input signal format supported by a first terminal device, the first identifier set is reported by the first terminal device, the second identifier set is configured to indicate at least one audio input signal format supported by a second terminal device, and the second identifier set is reported by the second terminal device; and determining, based on the first identifier set and the second identifier set, an audio input signal format used by the first terminal device and the second terminal device during establishment of a communication link, wherein determining, based on the first identifier set and the second identifier set, the audio input signal format used by the first terminal device and the second terminal device during the establishment of the communication link comprises:

in a case that the first identifier set comprises a third candidate identifier and the second identifier set comprises a fourth candidate identifier, determining an audio input signal format corresponding to the third candidate identifier as the audio input signal format used by the first terminal device during the establishment of the communication link, and determining an audio input signal format corresponding to the fourth candidate identifier as the audio input signal format used by the second terminal device during the establishment of the communication link.

2. The method according to claim 1, wherein one or both of:

the first identifier set is reported in response to the first terminal device accessing a network; or the second identifier set is reported in response to the second terminal device accessing a network.

3. The method according to claim 1, wherein determining, based on the first identifier set and the second identifier set, the audio input signal format used by the first terminal device and the second terminal device during the establishment of the communication link comprises:

in a case that both the first identifier set and the second identifier set comprise a first candidate identifier, determining an audio input signal format corresponding to the first candidate identifier as the audio input signal format used by the first terminal device and the second terminal device during the establishment of the communication link.

4. The method according to claim 1, wherein determining, based on the first identifier set and the second identifier set, the audio input signal format used by the first terminal device and the second terminal device during the establishment of the communication link comprises:

determining, based on the first identifier set, the second identifier set and a network state, the audio input signal format used by the first terminal device and the second terminal device during the establishment of the communication link.

5. The method according to claim 4, wherein both the first identifier set and the second identifier set comprise a first candidate identifier and a second candidate identifier; and determining, based on the first identifier set, the second identifier set and the network state, the audio input signal format used by the first terminal device and the second terminal device during the establishment of the communication link comprises:

in a case that the network state is in a first condition, determining an audio input signal format corresponding to the first candidate identifier as the audio input signal format used by the first terminal device and the second terminal device during the establishment of the communication link; and in a case that the network state is in a second condition, determining an audio input signal format corresponding to the second candidate identifier as the audio input signal format used by the first terminal device and the second terminal device during the establishment of the communication link, wherein the network in the first condition is different than the network in the second condition.

6. The method according to claim 1, wherein wherein the third candidate identifier is different from the fourth candidate identifier.

7. The method according to claim 6, further comprising:

determining the fourth candidate identifier according to an audio playback format capability possessed by the first terminal device; and determining the third candidate identifier according to an audio playback format capability possessed by the second terminal device.

8. The method according to claim 7, wherein an audio playback format comprises at least one of:

a headphone signal format; or a speaker signal format.

9. The method according to claim 8, wherein the headphone signal format comprises at least one of:

a mono-track signal format;

a stereo signal format; or a binaural signal format;

wherein the speaker signal format comprises at least one of:

a mono-track signal format; or a multi-track signal format.

10. A method for capability reporting, performed by a first terminal device, comprising:

reporting a first identifier set to a core network device, the first identifier set being configured to indicate at least one audio input signal format supported by the first terminal device;

wherein, the first identifier set is used for determining, in combination with a second identifier set, an audio input signal format used by the first terminal device and a second terminal device during establishment of a communication link, the second identifier set is configured to indicate at least one audio input signal format supported by the second terminal device, and the second identifier set is reported by the second terminal device to the core network device, wherein the method further comprises:

determining the at least one audio input signal format supported by the first terminal device according to an audio acquisition device connected to the first terminal device and a software processing algorithm capability possessed by the first terminal device, wherein the software processing algorithm capability comprises at least one of:

converting a signal acquired by a plurality of built-in microphones into one of a stereo signal, an object signal, or a spatial audio signal;

converting a signal acquired by an external audio signal acquisition ball into a spatial audio signal;

converting a signal acquired by a plurality of built-in microphones and a signal acquired by an external audio signal acquisition device into one of a stereo signal, an object signal, or a spatial audio signal; or converting a signal acquired by a plurality of built-in microphones into a metadata-assisted spatial audio (MASA) signal or another form of spatial audio signal through parameter analysis.

11. The method according to claim 10, wherein reporting the first identifier set to the core network device comprises:

reporting the first identifier set to the core network device in response to accessing a network.

12. The method according to claim 10, further comprising:

determining a unique corresponding identifier for each of the at least one audio input signal format.

13. The method according to claim 10, wherein the audio acquisition device comprises at least one of:

a built-in single microphone;

a plurality of built-in microphones; or an external audio signal acquisition device, wherein the external audio signal acquisition device comprises at least one of:

an audio signal acquisition ball;

a microphone audio acquisition array; or a control-by-wire headphone.

14. The method according to claim 10, further comprising:

reporting an audio playback format capability possessed by the first terminal device to the core network device.

15. The method according to claim 10, wherein single microphone is built in the first terminal device, and the audio input signal format supported by the first terminal device comprises at least one of:

a mono-track signal; or an object signal, wherein the object signal comprises a mono-track audio signal and a single-channel metadata signal.

16. The method according to claim 10, wherein plurality of microphones are built in the first terminal device or the first terminal device is externally connected to an external audio signal acquisition device, and the audio input signal format supported by the first terminal device comprises at least one of:

a mono-track signal;

a dual-track signal;

a multi-track signal;

an object signal;

a metadata-assisted spatial audio (MASA) format signal; or a spatial audio signal, wherein the object signal comprises at least one track audio signal and one channel metadata signal, or wherein the spatial audio signal comprises at least one of:

at least one track signal;

a background signal; or a metadata signal.

17. The method according to claim 10, wherein one or more microphones are built in the first terminal device, and the first terminal device is externally connected to an audio signal acquisition device, and the audio input signal format supported by the first terminal device comprises at least one of:

a mono-track signal;

a dual-track signal;

a multi-track signal;

an object signal; or a spatial audio signal, wherein the object signal comprises at least one track audio signal and one channel metadata signal, or wherein the spatial audio signal comprises at least one of:

at least one track signal;

a background signal; or a metadata signal.

18. A first terminal device, comprising:

a processor; and a memory storing instructions executable by the processor, wherein the processor is configured to perform the method according to claim 10.

19. A core network device, comprising:

a processor; and a memory storing instructions executable by the processor, wherein the processor is configured to:

receive a first identifier set, and receive a second identifier set, wherein the first identifier set is configured to indicate at least one audio input signal format supported by a first terminal device, the first identifier set is reported by the first terminal device, the second identifier set is configured to indicate at least one audio input signal format supported by a second terminal device, and the second identifier set is reported by the second terminal device; and determine, based on the first identifier set and the second identifier set, an audio input signal format used by the first terminal device and the second terminal device during establishment of a communication link, wherein determining, based on the first identifier set and the second identifier set, the audio input signal format used by the first terminal device and the second terminal device during the establishment of the communication link comprises:

in a case that the first identifier set comprises a third candidate identifier and the second identifier set comprises a fourth candidate identifier, determining an audio input signal format corresponding to the third candidate identifier as the audio input signal format used by the first terminal device during the establishment of the communication link, and determining an audio input signal format corresponding to the fourth candidate identifier as the audio input signal format used by the second terminal device during the establishment of the communication link.

* * * * *